United States Patent
Dalsgaard et al.

(10) Patent No.: US 9,801,130 B2
(45) Date of Patent: Oct. 24, 2017

(54) SECONDARY CELL STATE ACTIVATION AND DEACTIVATION OF GAPS

(71) Applicant: Nokia Technologies Oy, Espoo (FI)

(72) Inventors: Lars Dalsgaard, Oulu (FI); Li Zhang, Beijing (CN); Kamil Bechta, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 74 days.

(21) Appl. No.: 14/853,644

(22) Filed: Sep. 14, 2015

(65) Prior Publication Data

US 2016/0192291 A1 Jun. 30, 2016

Related U.S. Application Data

(60) Provisional application No. 62/056,210, filed on Sep. 26, 2014.

(51) Int. Cl.
| | |
|---|---|
| *G08C 17/00* | (2006.01) |
| *H04W 52/02* | (2009.01) |
| *H04W 76/04* | (2009.01) |
| *H04W 24/10* | (2009.01) |

(52) U.S. Cl.
CPC ....... *H04W 52/0216* (2013.01); *H04W 24/10* (2013.01); *H04W 52/0235* (2013.01); *H04W 76/048* (2013.01); *Y02B 60/50* (2013.01)

(58) Field of Classification Search
None
See application file for complete search history.

(56) References Cited

U.S. PATENT DOCUMENTS

| | | |
|---|---|---|
| 8,526,948 B2 | 9/2013 | Uchiyama et al. |
| 2011/0274007 A1 | 11/2011 | Lin et al. |
| 2013/0107743 A1 | 5/2013 | Ishii et al. |
| 2014/0228027 A1 | 8/2014 | Kuo |

(Continued)

FOREIGN PATENT DOCUMENTS

| | | |
|---|---|---|
| KR | 2014-0022711 A | 2/2014 |
| WO | 2013/172757 A1 | 11/2013 |

(Continued)

OTHER PUBLICATIONS

Extended European Search Report received for corresponding European Patent Application No. 15184228.3, dated Feb. 17, 2016, 7 pages.

(Continued)

*Primary Examiner* — Chi H Pham
*Assistant Examiner* — Fahmida Chowdhury
(74) *Attorney, Agent, or Firm* — Squire Patton Boggs (US) LLP

(57) ABSTRACT

Various communication systems may benefit from insight regarding when a device is performing power saving operations. For example, wireless communication systems may benefit from secondary cell state activation and deactivation of measurement gaps. A method can include determining, by a user equipment, whether a secondary cell is in an activated state or an inactivated state. The method can also include selectively enabling or disabling measurement gaps for the user equipment based on the determined state of the secondary cell.

15 Claims, 4 Drawing Sheets

(56) References Cited

U.S. PATENT DOCUMENTS

| | | | |
|---|---|---|---|
| 2015/0124728 A1* | 5/2015 | Bergstrom | H04L 5/001 370/329 |
| 2015/0327054 A1* | 11/2015 | Callender | H04W 8/183 370/329 |
| 2016/0302228 A1* | 10/2016 | Kazmi | H04L 1/1887 |

FOREIGN PATENT DOCUMENTS

| | | |
|---|---|---|
| WO | 2014/116049 A1 | 7/2014 |
| WO | 2014/188330 A1 | 11/2014 |

OTHER PUBLICATIONS

"3rd Generation Partnership Project; Technical Specification Group Radio Access Network; Evolved Universal Terrestrial Radio Access (E-UTRA); Requirements for support of radio resource management (Release 12)", 3GPP TS 36.133, V12.2.0, Dec. 2013, pp. 1-815.

"Discussion on Enabling and Disabling of Measurement Gaps According to Scell Activation State", 3GPP TSG-RAN WG4 Meeting #73, R4-147385, Agenda item: 7.37.4, Nokia Networks, Nov. 17-21, 2014, 3 pages.

"3rd Generation Partnership Project; Technical Specification Group Radio Access Network; Evolved Universal Terrestrial Radio Access (E-UTRA); Requirements for support of radio resource management (Release 12)", 3GPP TS 36.133, V12.4.0, Jul. 2014, pp. 1-27.

"WF on Solution for Small Gap Measurements in Rel-12", TSG-RAN Working Group 4 (Radio) meeting #72, R4-145349, Nokia Networks, Aug. 18-22, 2014, 3 pages.

"Way Forward on Interruptions for CA", 3GPP TSG-RAN Meeting # 65, RP-141678, Qualcomm Incorporated, Sep. 9-12, 2014, 2 pages.

"Way Forward on PCell Interruption for Deactivated SCell Measurements in Rel-11", 3GPP TSG-RAN WG4 Meeting #72, R4-145347, Ericsson, Aug. 18-22, 2014, 2 pages.

EP Office Action received for corresponding European Patent Application No. 15184228.3, dated Feb. 13, 2017, 5 pages.

* cited by examiner

SECONDARY CELL STATE ACTIVATION AND DEACTIVATION OF GAPS

BACKGROUND

Field

Various communication systems may benefit from insight regarding when a device is performing power saving operations. For example, wireless communication systems may benefit from secondary cell state activation and deactivation of measurement gaps.

Description of the Related Art

Certain carrier aggregation (CA) capable user equipment (UEs), or other multi-receiver UEs, may need interrupts under some conditions. Such need may be particularly relevant for some specific UE architectures, such as single chip architecture. Moreover, such a need may relate to UE operation and enabling UE power savings opportunities for all UE architectures and implementations.

Unforeseen and unpredictable interrupts, and consequently drop of data packets in both UL and DL, may also have an effect on the network. Some networks may be able to handle such interrupts and some may not. Additionally, some networks may accept some packet drop in some conditions such as low load conditions while not in other such as high load conditions. It may also be that the network only wants to allow interrupts for some services or devices and not from all.

In CA, dual connectivity (DC), or other scenarios, the rules may be such that the above-identified scenario may only occur when the secondary cell (SCell) is in deactivated state, or when all SCells are in a deactivated state. When the SCells, or at least one of the SCells, are activated, the UE requirements may be such that interrupts will not happen. This may be because CA operates with common discontinuous reception (DRX). Thus, the UE may follow DRX on primary cell (PCell) when it comes to SCell monitoring and measurement requirements. There can be one or more SCells configured on a PSCell in a similar way as on PCell.

In release 10 (Rel-10) of the third generation partnership project (3GPP) the UE is allowed 0.5% interrupts if the deactivated SCell measurement cycle (measCycleScell) is 640 ms or longer. Otherwise, when the measCycleScell is shorter than 640 ms, no interrupts are allowed.

In certain approaches not yet standardized, a UE may be able to indicate the need for interrupts and the network may be able to allow/not allow the UE to interrupt. Other optimizations, like a new gap pattern, are also not standardized.

SUMMARY

According to a first embodiment, a method can include determining, by a user equipment, whether a secondary cell is in an activated state or an inactivated state. The method can also include selectively enabling or disabling measurement gaps for the user equipment based on the determined state of the secondary cell.

In a variant, the gaps can be active only when the secondary cell is not in an active state.

In a variant, the method can further include detecting a change in the determined state of the secondary cell. The method can also include changing a state of the measurement gaps based on the detected change.

In a variant, the determining or the detecting the change can be based on a medium access control message configured to control the state of the secondary cell.

In a variant, the method can further include indicating to the network whether the user equipment supports gap pattern enablement/disablement.

In a variant, the selectively enabling or disabling can be conditioned on determining that the network supports or allows gap pattern enablement/disablement.

According to a second embodiment, a method can include determining, by a network, whether a secondary cell is in an activated state or an inactivated state. The method can also include determining whether measurement gaps for a user equipment are enabled or disabled based on the determined state of the secondary cell.

In a variant, the gaps can be active only when the secondary cell is not in an active state.

In a variant, the method can further include detecting a change in the determined state of the secondary cell. The method can also include determining that a state of the measurement gaps has changed based on the detected change of the state of the secondary cell.

In a variant, the determining or the detecting the change can be based on a medium access control message configured to control the state of the secondary cell.

In a variant, the method can further include indicating to the user equipment whether the network supports or allows gap pattern enablement/disablement.

In a variant, the determining whether measurement gaps are enabled or disabled can be conditioned on determining that the user equipment supports gap pattern enablement/disablement.

According to third and fourth embodiments, an apparatus can include means for performing the method of the first or second embodiment in any of their variants, respectively.

According to fifth and sixth embodiments, an apparatus can include at least one processor and at least one memory including computer program code. The at least one memory and the computer program code can be configured to, with the at least one processor, cause the apparatus at least to perform the method according to the first or second embodiment in any of their variants, respectively.

A non-transitory computer-readable medium can, in seventh and eighth embodiments, be encoded with instructions that, when executed in hardware, perform a process. The process can include the method according to the first or second embodiment in any of their variants, respectively.

A computer program product, in ninth and tenth embodiments, can encode instructions for performing a process. The process can include the method according to the first or second embodiment in any of their variants, respectively.

BRIEF DESCRIPTION OF THE DRAWINGS

For proper understanding of the invention, reference should be made to the accompanying drawings, wherein.

DETAILED DESCRIPTION

Figure 1:
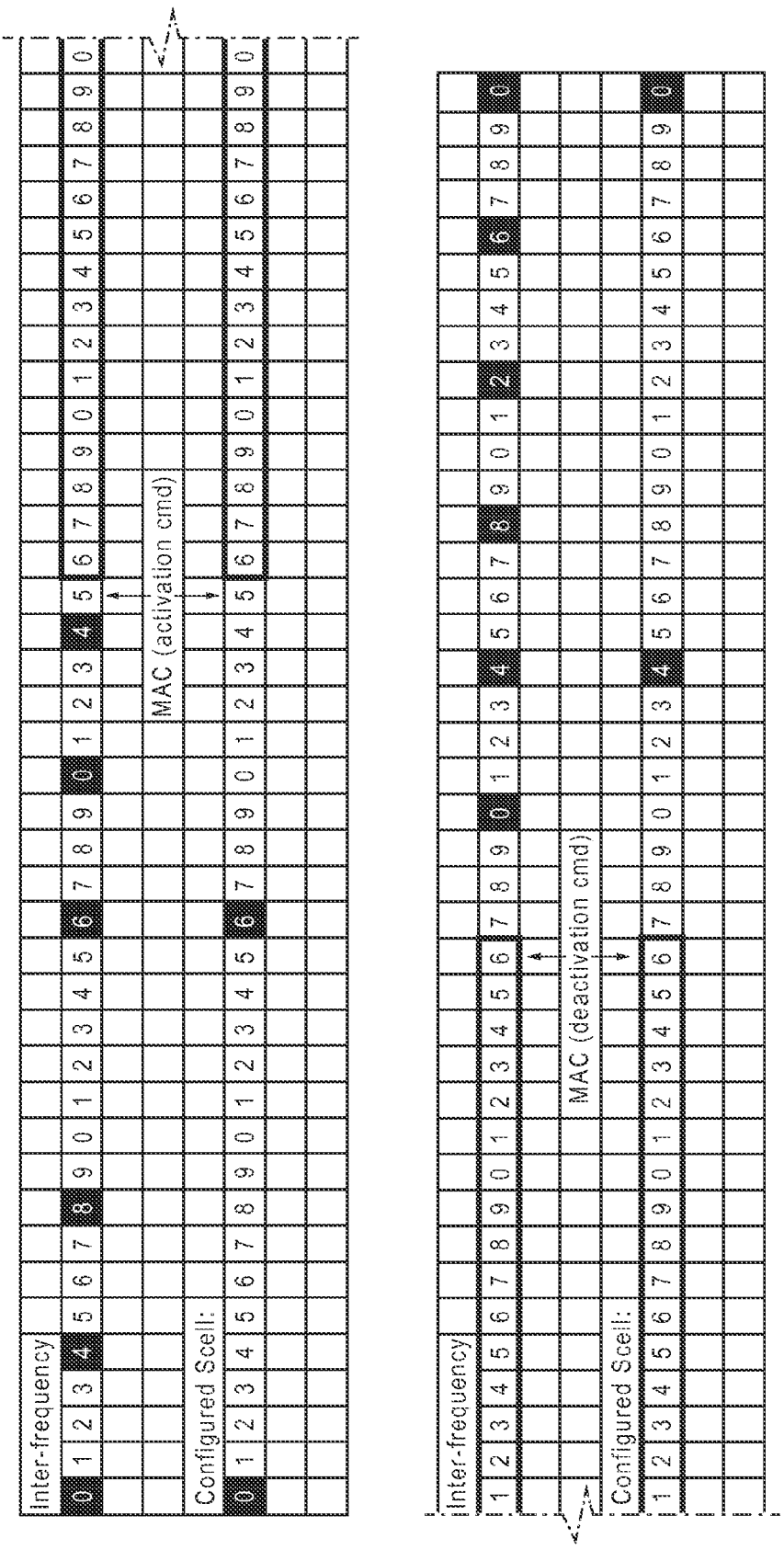
FIG. 1 illustrates smart gap assignment for blind and non-blind CA configurations, according to certain embodiments.

In order to enable better user equipment (UE) power savings, or for other or additional purposes, it may be beneficial to provide a solution that allows and applies interrupts independent from a configured measCycleScell or in general.

One challenge is how to be able to fulfill the UE's need for power savings while ensuring a better overall system, as seen from a user experience perspective. Moreover, it can be a challenge to maintain system functionality and network control such that the overall system performance is still under network control.

There are various extreme options, such as allowing complete UE autonomous control of when interrupts can happen or re-using existing gap patterns to ensure no interrupts and only known gaps with no data loss. By contrast, what may be useful is a solution that enables low or no network/system impact while on the other hand also enables the necessary UE power savings for all UE architecture types.

If a UE causing interrupts has been configured with measurement gaps in order to enable inter-frequency measurements or measurements on a deactivated SCell without packet drops or interrupts—such gaps may only be active when the SCell is not in activated state. The gaps may use an existing style or a new style.

When the deactivated SCell is activated, and there is e.g. no need for inter-frequency or deactivated SCell measurements, the gaps can be disabled. When one or more SCell's state changes back to deactivated state, or is deconfigured, the gaps can again be enabled. Alternatively, the gaps can be enabled again only when all SCells are in a deactivated state or are deconfigured. Thus, for example, the gap pattern assigned to the UE can be active according to the SCell state.

Enabling and disabling of the gaps can done by, for example, using an existing medium access control (MAC) message controlling the SCell state, such as activation and deactivation of the SCell. Other alternatives, like a new MAC command, could be used.

The following provides examples of how this could be used and specified, using enhanced universal mobile telecommunications system (UMTS) terrestrial radio access network (E-UTRAN) as an example. In this example a UE is causing interruptions when configured with CA and, for example, performing measurements in a deactivated SCell.

When the UE is configured with the SCell, the UE can also be configured with a gap pattern. The gap pattern can enable the UE to perform the measurements on the deactivated SCell without causing interruptions and packet drops on the PCell. As long as the SCell is in a deactivated state, the UE may need to measure the SCell according to the configured deactivated measurement cycle, measCycleScell.

When the SCell is activated, the UE may need to follow the monitoring and measurement rules on the SCell according to the rules for monitoring and measurements on the PCell. The network can control the SCell state change by using a MAC SCell activation/deactivation command. The UE activation and deactivation delay requirements have been defined in 3GPP TS 36.133, which is hereby incorporated herein by reference in its entirety. The UE activation and deactivation delay requirements can provide rules on UE maximum delays and can guide the network as to when the network can, at a minimum, expect the UE to have performed the activation and/or deactivation procedures.

When the SCell is activated and follows the PCell monitoring and measurement rules, there can be synchronous behavior between the PCell and the SCell. Thus, when the SCell is in an activated state there may be no interrupts on the PCell due to SCell activity. Hence, there may no longer be a need to keep the gaps active.

Thus, instead of leaving a gap pattern active and reducing the UL/DL scheduling flexibility in the network, certain embodiments deactivate the gap pattern while the SCell is in an active state.

FIG. 1 illustrates smart gap assignment for blind and non-blind CA configurations, according to certain embodiments. Thus, FIG. 1 illustrates two examples of CA configuration. The first example is the blind configuration example, in which the network configures the UE with the SCell, followed immediately by an activation command. In this case, the measurement can be done prior to configuration by using an existing inter-frequency measurement approach. The second example is where the SCell is configured and deactivated, with a given measCycleScell—here 160 ms, prior to network activating the SCell.

In both cases, the UE can have a gap pattern assigned for performing inter-frequency measurement. This may be an existing gap pattern or a new gap patter. In both cases this gap pattern can be put on hold when the SCell is activated by the network. When the network deactivates or deconfigures the SCell, the gap pattern can again be active.

Due to the fact that activation and deactivation of the SCell can be controlled by the network and acknowledged by the UE—it may be possible to ensure that gap pattern use is synchronized between the UE and the network. Thus, both entities can have a common understanding of when the gaps are available and when the gaps not available. When the gaps are not available, the instances where the gaps were can be re-allocated to increase scheduling flexibility without gaps.

Although CA and SCell have been used here in the description of the examples, the method can also be applied for pSCell, such as in a dual connectivity scenario. Although SCell is sometimes mentioned in the singular, the same principles can be applied to a plurality of SCells. Additionally it may apply to SCell(s) both in connection with CA and Dual Connectivity and SCells on PCell and PSCell.

Additionally, this method can also be implemented as an implementation solution. In other words, the solution can be agreed as a common understanding that gaps not used in CA will be available for the network for scheduling. Both UE and network would be able to recognize this situation, and so explicit specification support may not be necessary.

Alternatively the network could indicate to the UE whether it supports or does not support (or allow/not allow) such behavior from the UE. The UE may also indicate to network if it supports such approach. For example, the network can know what the network has configured the UE to measure. The UE knows what the UE is configured to measure. Based on this knowledge, both the network and the UE can deduce from the configuration whether the assigned gaps are used when SCell is activated or not.

Figure 2:
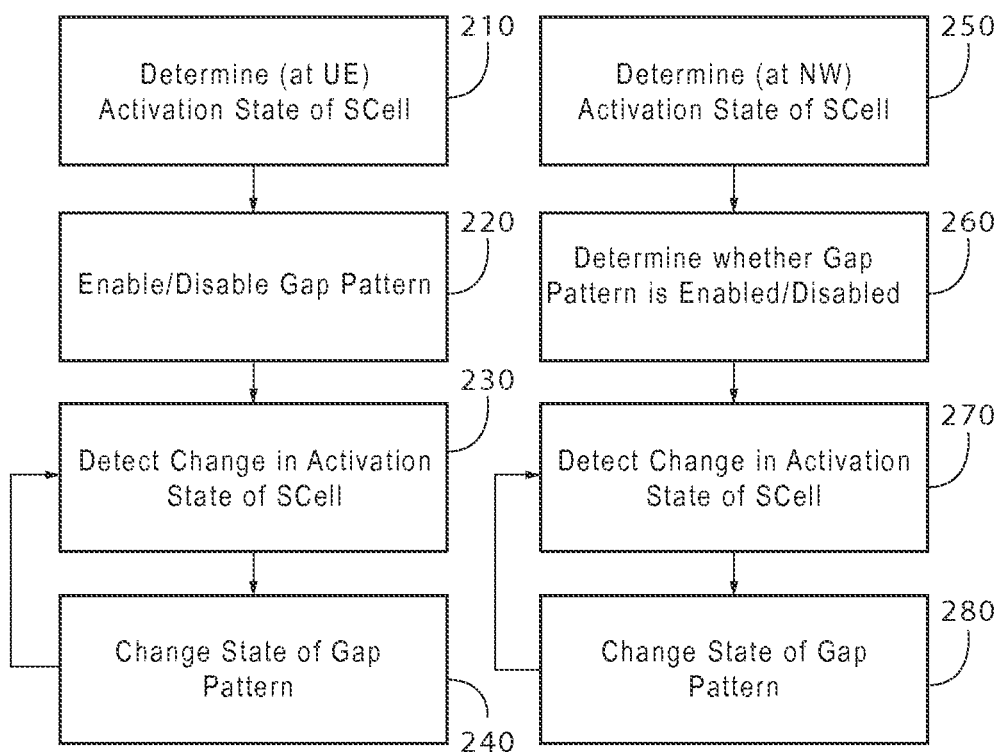
FIG. 2 illustrates a method according to certain embodiments.

FIG. 2 illustrates a method according to certain embodiments. As shown in FIG. 2, a method can include, at 210, determining, by a user equipment, whether a secondary cell is in an activated state or an inactivated state. The method can also include, at 220, selectively enabling or disabling measurement gaps for the user equipment based on the determined state of the secondary cell. In certain embodiments, the gaps can be active only when the secondary cell is not in an active state.

The method can further include, at 230, detecting a change in the determined state of the secondary cell. For example, the change can be from inactivated to activated or from activated to inactivated. The method can also include, at 240, changing a state of the measurement gaps based on the detected change. The determining the state of the secondary cell or the detecting the change in the state of the secondary cell can be based on a medium access control message configured to control the state of the secondary cell.

The method can also include, at 250, determining, by a network, whether a secondary cell is in an activated state or an inactivated state. The method can further include, at 260, determining whether measurement gaps for a user equipment are enabled or disabled based on the determined state of the secondary cell. As noted above, in certain embodiments the gaps can be active/enabled only when the secondary cell is not in an active state.

The method can additionally include, at 270, detecting a change in the determined state of the secondary cell. The method can also include, at 280, determining that a state of the measurement gaps has changed based on the detected change of the state of the secondary cell. As noted above, determination or detection of the change of state of SCell can be based on a medium access control message configured to control the state of the secondary cell or an acknowledge signal of a medium access control message sent to the UE, configured to control the state of the secondary cell.

Figure 3:
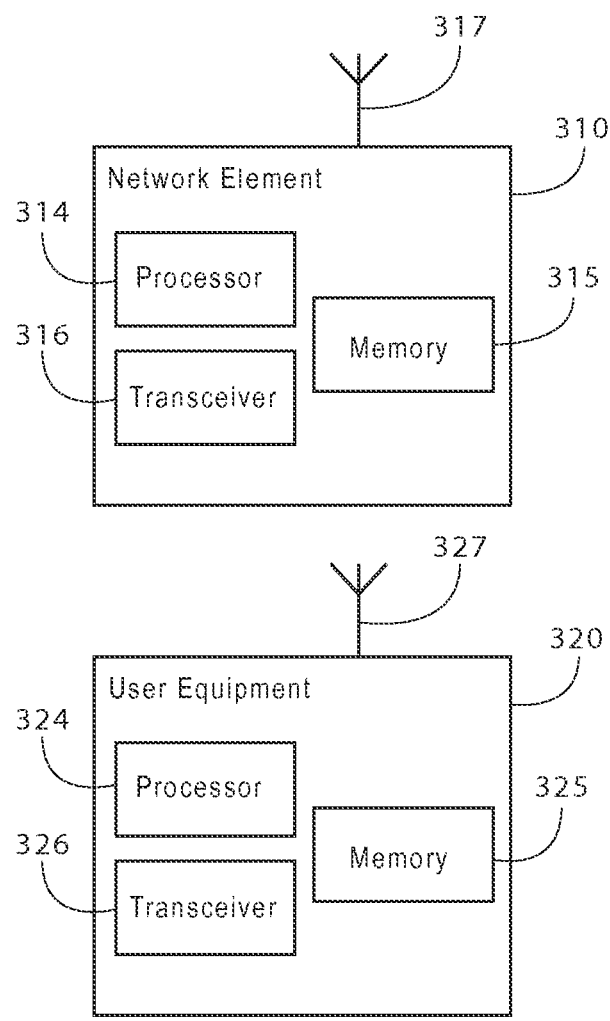
FIG. 3 illustrates a system according to certain embodiments of the invention.

FIG. 3 illustrates a system according to certain embodiments of the invention. It should be understood that each block of the flowchart of FIG. 2 or FIG. 4 may be implemented by various means or their combinations, such as hardware, software, firmware, one or more processors and/or circuitry. In one embodiment, a system may include several devices, such as, for example, network element 310 and user equipment (UE) or user device 320. The system may include more than one UE 320 and more than one network element 310, although only one of each is shown for the purposes of illustration. A network element can be an access point, a base station, an eNode B (eNB), or any other network element. Each of these devices may include at least one processor or control unit or module, respectively indicated as 314 and 324. At least one memory may be provided in each device, and indicated as 315 and 325, respectively. The memory may include computer program instructions or computer code contained therein. One or more transceiver 316 and 326 may be provided, and each device may also include an antenna, respectively illustrated as 317 and 327. Although only one antenna each is shown, many antennas and multiple antenna elements may be provided to each of the devices. For example, a two-dimensional array of antenna elements may be used by network element 310. Other configurations of these devices, for example, may be provided. For example, network element 310 and UE 320 may be additionally configured for wired communication, in addition to wireless communication, and in such a case antennas 317 and 327 may illustrate any form of communication hardware, without being limited to merely an antenna.

Transceivers 316 and 326 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is as software that can run on a server.

A user device or user equipment 320 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 320 may be a sensor or smart meter, or other device that may usually be configured for a single location.

In an exemplifying embodiment, an apparatus, such as a node or user device, may include means for carrying out embodiments described above in relation to FIG. 2 or below in relation to FIG. 4.

Processors 314 and 324 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 315 and 325 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 310 and/or UE 320, to perform any of the processes described above (see, for example, FIG. 2 or FIG. 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 3 illustrates a system including a network element 310 and a UE 320, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

Figure 4:
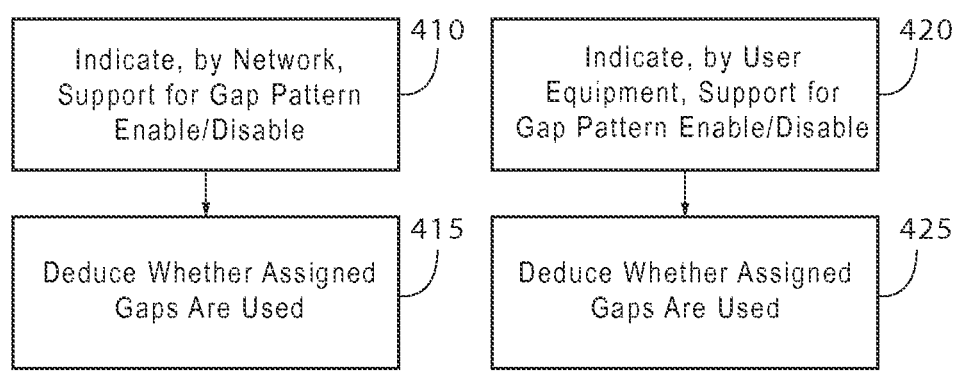
FIG. 4 illustrates another method according to certain embodiments.

FIG. 4 illustrates another method according to certain embodiments. As shown in FIG. 4, at 410 a network can indicate to a UE whether the network supports or does not support, or allows/disallows, gap pattern enablement/disablement by the UE. The UE may also, at 420, indicate to the network if the UE supports such an approach. For example, as mentioned above, the network can know what the network has configured the UE to measure, while the UE can know what the UE is configured to measure. Based on this knowledge, both the network, at 415, and the UE, at 425, can deduce from the configuration whether the assigned gaps are used when SCell is activated or not.

Certain embodiments may have various benefits and/or advantages. For example, certain embodiments may enable full use of all resources when SCell is active. Furthermore, certain embodiments may enable the gap availability when needed, for example if SCell is deactivated.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Explanation of Abbreviations
UE user equipment
eNB enhanced NodeB
SCell secondary cell
PCell primary cell
pSCell special secondary cell
MAC medium access control
CA carrier aggregation
CR change request

We claim:

1. A method, comprising:
determining, by a user equipment, whether a secondary cell is in an activated state or an inactivated state;
selectively enabling or disabling measurement gaps for the user equipment based on the determined state of the secondary cell;
detecting a change in the determined state of the secondary cell; and
changing a state of the measurement gaps based on the detected change,
wherein the change comprises a change from inactivated to activated or from activated to inactivated.

2. The method of claim 1, further comprising:
indicating to a network whether the user equipment supports gap pattern enablement/disablement.

3. The method of claim 1, further comprising,
receiving an indication from a network regarding whether the network supports or does not support, or allows/disallows, gap pattern enablement/disablement by the user equipment, wherein the selectively enabling or disabling is based on the received indication.

4. An apparatus, comprising:
at least one processor; and
at least one memory including computer program code, wherein the at least one memory and the computer program code are configured to, with the at least one processor, cause the apparatus at least to
determine, by a user equipment, whether a secondary cell is in an activated state or an inactivated state; and
selectively enable or disable measurement gaps for the user equipment based on the determined state of the secondary cell;
detect a change in the determined state of the secondary cell; and
change a state of the measurement gaps based on the detected change,
wherein the change comprises a change from inactivated to activated or from activated to inactivated.

5. The apparatus of claim 4, wherein the gaps are active only when the secondary cell is not in an active state.

6. The apparatus of claim 4, wherein the at least one memory and the computer program code are configured to, with the at least one processor, cause the apparatus at least to detect the change based on a medium access control message configured to control the state of the secondary cell.

7. The apparatus of claim 4, wherein the at least one memory and the computer program code are configured to, with the at least one processor, cause the apparatus at least to indicate to a network whether the user equipment supports gap pattern enablement/disablement.

8. The apparatus of claim 4, wherein the at least one memory and the computer program code are configured to, with the at least one processor, cause the apparatus at least to selectively enable or disable conditioned on determining that a network supports or allows gap pattern enablement/disablement.

9. The apparatus of claim 4, wherein the at least one memory and the computer program code are configured to, with the at least one processor, cause the apparatus at least to receive an indication from a network regarding whether the network supports or does not support, or allows/disallows, gap pattern enablement/disablement by the user equipment, and to base the selective enabling or disabling of the measurement gaps based on the received indication.

10. An apparatus, comprising:
at least one processor; and
at least one memory including computer program code, wherein the at least one memory and the computer program code are configured to, with the at least one processor, cause the apparatus at least to
determine, by a network, whether a secondary cell is in an activated state or an inactivated state;
determine whether measurement gaps for a user equipment are enabled or disabled based on the determined state of the secondary cell;
detect a change in the determined state of the secondary cell; and
determine that a state of the measurement gaps has changed based on the detected change of the state of the secondary cell,
wherein the change comprises a change from inactivated to activated or from activated to inactivated.

11. The apparatus of claim 10, wherein the gaps are active only when the secondary cell is not in an active state.

12. The apparatus of claim 10, wherein the at least one memory and the computer program code are configured to, with the at least one processor, cause the apparatus at least to detect the change is based on a medium access control message configured to control the state of the secondary cell.

13. The apparatus of claim 10, wherein the at least one memory and the computer program code are configured to, with the at least one processor, cause the apparatus at least to indicate to the user equipment whether the network supports or allows gap pattern enablement/disablement.

14. The apparatus of claim 10, wherein the at least one memory and the computer program code are configured to, with the at least one processor, cause the apparatus at least to determine whether measurement gaps are enabled or disabled conditioned on determining that the user equipment supports gap pattern enablement/disablement.

15. An apparatus, comprising:
at least one processor; and
at least one memory including computer program code, wherein the at least one memory and the computer program code are configured to, with the at least one processor, cause the apparatus at least to
detect, by a user equipment, a change of a secondary cell from an activated state to an inactivated state or from an activated state to an inactivated state; and
change a state of measurement gaps from enabled measurement gaps to disabled measurement gaps or from disabled measurement gaps to enabled measurement gaps in dependence on the detected change of state of the secondary cell from the inactive state to the active state or from the active state to the inactive state.

\* \* \* \* \*